(12) United States Patent
Jewett et al.

(10) Patent No.: US 11,035,421 B2
(45) Date of Patent: Jun. 15, 2021

(54) CLUTCH WITH VARIABLE LUBRICATION SUPPLY

(71) Applicant: General Electric Company, Schenectady, NY (US)

(72) Inventors: Jason Winfred Jewett, Clifton Park, NY (US); Thomas Joseph Farineau, Burnt Hills, NY (US); Siddharth Navinchandra Ashar, Niskayuna, NY (US); Andrew John Lammas, Greenville, SC (US); Paul Richard Stukenborg, Guilderland, NY (US); Eric Paul Knopf, Wurenlingen (CH); Mateusz Wojciech Golebiowski, Rutihof (CH); Chad Duncan Munkres, Schenectady, NY (US); Eric Lorin Letterman, Glenville, NY (US)

(73) Assignee: General Electric Company, Schenectady, NY (US)

( * ) Notice: Subject to any disclaimer, the term of this patent is extended or adjusted under 35 U.S.C. 154(b) by 135 days.

(21) Appl. No.: 16/401,059

(22) Filed: May 1, 2019

(65) Prior Publication Data
US 2020/0347893 A1   Nov. 5, 2020

(51) Int. Cl.
*F16D 23/02* (2006.01)
*F16D 11/14* (2006.01)
(Continued)

(52) U.S. Cl.
CPC ............. *F16D 33/12* (2013.01); *F16D 11/14* (2013.01); *F16D 23/02* (2013.01); *F16D 23/10* (2013.01);
(Continued)

(58) Field of Classification Search
CPC ...... F16D 23/02; F16D 23/10; F16D 2300/06; F16D 2300/18; F16D 11/14; F16D 33/12; F16D 48/06; F16D 2048/0269; F16D 2048/0275; Y02E 20/16; F01K 23/12; F01K 23/16; G01H 1/00–1/16
(Continued)

(56) References Cited

U.S. PATENT DOCUMENTS

3,534,843 A    10/1970  Sinclair et al.
3,904,006 A *  9/1975  Clements ................ F16D 23/10
                                          192/69.3
(Continued)

*Primary Examiner* — Richard M Lorence
(74) *Attorney, Agent, or Firm* — James W. Pemrick; Charlotte C. Wilson (57) ABSTRACT

A clutch system configured to transmit torque between an input shaft and an output shaft. The clutch system may include a clutch and a lubrication supply system. The clutch may include: an input portion disposed at an end of the input shaft; an output portion disposed at an end of the output shaft; and a sliding component that slides axially between the input and output portions to engage the clutch. The lubrication supply system may include: one or more lubricant feeds for delivering a lubricant to the clutch; and one or more lubricant drains for draining the lubricant from the clutch. The one or more lubricant feeds may include one or more respective valves. The one or more valves each may be configurable between settings that vary an amount of the lubricant delivered to the clutch via the respective one of the one or more lubricant feeds.

14 Claims, 5 Drawing Sheets

(51) Int. Cl.
    *F16D 48/06*     (2006.01)
    *F16D 23/10*     (2006.01)
    *F16D 48/02*     (2006.01)
    *F16D 33/12*     (2006.01)

(52) U.S. Cl.
    CPC ...... *F16D 48/06* (2013.01); *F16D 2048/0269* (2013.01); *F16D 2048/0275* (2013.01); *F16D 2300/06* (2013.01)

(58) Field of Classification Search
    USPC .............................. 192/69.3, 113.33, 113.35
    See application file for complete search history.

(56) References Cited

U.S. PATENT DOCUMENTS

| | | | | | |
|---|---|---|---|---|---|
| 3,915,271 | A | * | 10/1975 | Harper | B63H 23/30 |
| | | | | | 477/5 |
| 3,943,374 | A | * | 3/1976 | Clements | F01D 5/026 |
| | | | | | 290/52 |
| 4,055,240 | A | * | 10/1977 | Clements | F16D 23/10 |
| | | | | | 192/69.3 |
| 6,415,667 | B1 | * | 7/2002 | Kyrtsos | G01H 1/003 |
| | | | | | 73/660 |
| 7,691,028 | B2 | | 4/2010 | Hattenbach et al. | |
| 8,472,033 | B2 | | 6/2013 | Takeda | |
| 9,752,509 | B2 | | 9/2017 | Clayton et al. | |
| 2015/0040640 | A1 | * | 2/2015 | Chen | F01K 5/02 |
| | | | | | 73/1.15 |

\* cited by examiner

CLUTCH WITH VARIABLE LUBRICATION SUPPLY

BACKGROUND OF THE INVENTION

The present invention relates to an oil delivery system for use with a clutch. More specifically, but not by way of limitation, the present application relates to methods and systems for lubricating a clutch, and particularly, to methods and systems for providing variable supply and drainage of lubricant in a clutch for performance benefits.

As will be appreciated, certain types of clutches, such as, for example, a synchronizing self-shifting ("SSS") clutch, require a supply of lubricant during operation to perform in a desired way. In a SSS clutch, proper operation includes meshing teeth at the instant when the speeds of an input shaft and an output shaft are synchronized. This is achieved precisely and without the possibility of error, by means of the pawl actuated helical sliding motion. That is, when the speeds of the shafts pass through synchronism, the pawls on one clutch element engage with ratchet teeth on the other clutch element and move a sliding component along helical splines, thereby engaging the driving and driven clutch teeth smoothly and positively. To protect the mechanisms involved in such operation from undue wear, a supply of lubricant is provided to the various components within the SSS clutch. In conventional systems, however, the delivered lubricant can become entrapped within various interior cavities of the SSS clutch, which can lead to operational issues, such as vibration, that can have detrimental effects.

BRIEF DESCRIPTION OF THE INVENTION

The present application thus describes a clutch system configured to transmit torque between an input shaft and an output shaft. The clutch system may include a clutch and a lubrication supply system. The clutch may include: an input portion disposed at an end of the input shaft; an output portion disposed at an end of the output shaft; and a sliding component that slides axially between the input and output portions to engage the clutch. The lubrication supply system may include: one or more lubricant feeds for delivering a lubricant to the clutch; and one or more lubricant drains for draining the lubricant from the clutch. The one or more lubricant feeds may include one or more respective valves. The one or more valves each may be configurable between settings that vary an amount of the lubricant delivered to the clutch via the respective one of the one or more lubricant feeds.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
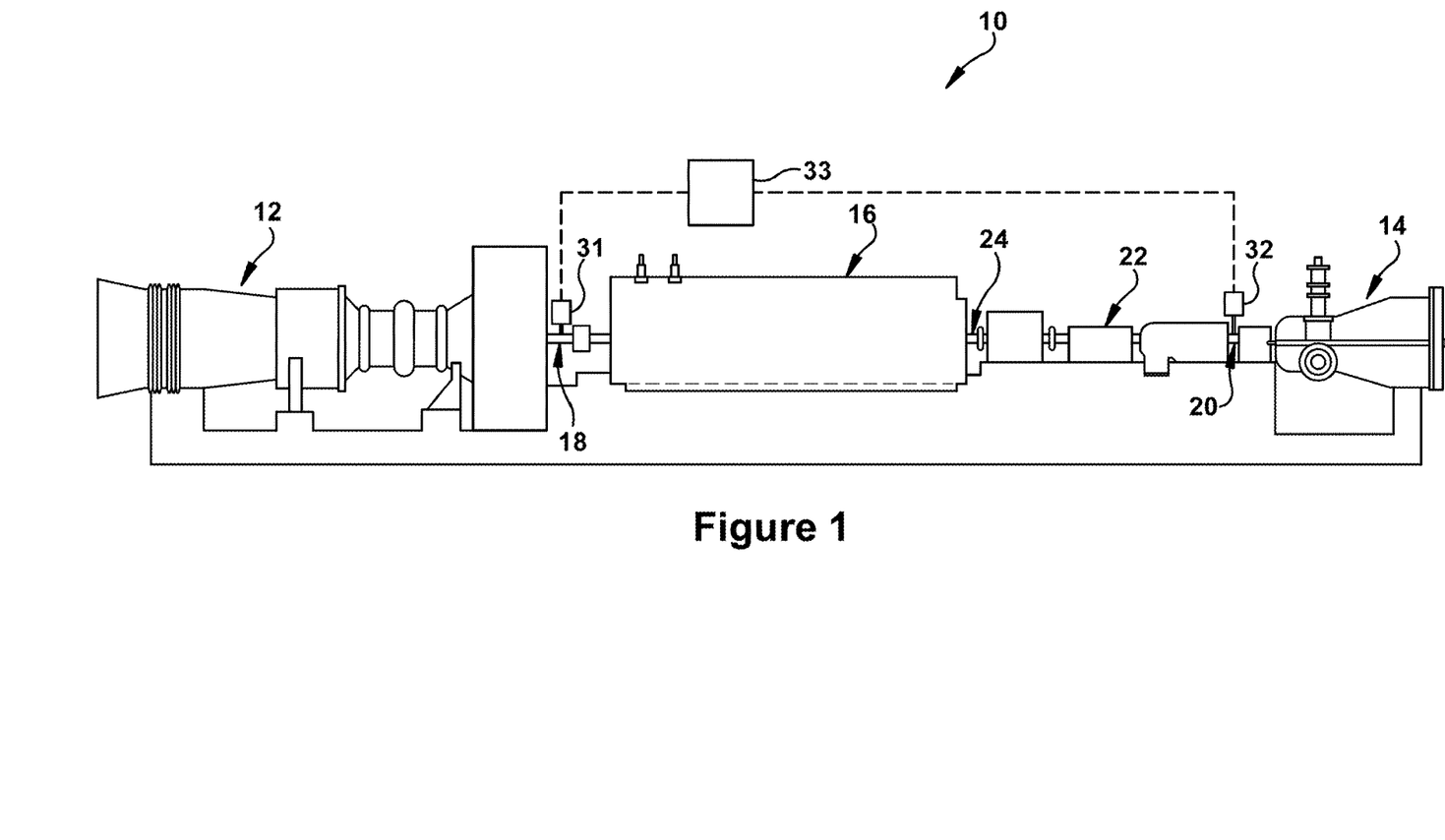
FIG. 1 is a schematic diagram of a combined cycle power plant that includes a clutch in accordance embodiments of the present application or within which embodiments of the present application may be practiced.

Referring now to FIG. 1, a combined cycle power plant (or "CCPP") 10 is shown that includes a clutch in accordance embodiments of the present application or within which embodiments of the present application may be practiced. The CCPP 10 includes a first machine comprising a gas turbine 12 and a second machine comprising a steam turbine 14, wherein the gas and steam turbines 12, 14 cooperate to provide work output to a generator 16 of the CCPP 10 for the production of electrical power. The gas turbine 12 may include conventional compression, combustion, and turbine sections, and the steam turbine 14 may include conventional condenser, boiler, and turbine sections. The configuration of each of these sections will be readily apparent to those having ordinary skill in the art and will not be specifically discussed herein.

The gas turbine 12 also includes a first rotatable shaft, also referred to herein as an output shaft 18, and the steam turbine 14 includes a second rotatable shaft, also referred to herein as an input shaft 20. A clutch 22 is provided to couple the output and input shafts 18, 20. When coupled together, the output and input shafts 18, 20 may be referred to herein as a combined shaft 24. As shown in FIG. 1, the combined shaft 24 is coupled to the generator 16 and drives the generator 16 for the production of electrical power in a manner that will be apparent to those having ordinary skill in the art.

The clutch 22 may comprise a synchronizing self-shifting clutch (or "SSS") clutch. As described in more detail below, the SSS clutch 22 generally includes a number of gear teeth associated with each of the respective output and input shafts 18, 20, wherein the number of gear teeth for each shaft 18, 20 predicts the number of possible angular engagement positions in which the input shaft 20 can be coupled to the output shaft 18. As described herein, the clutch 22 engages the shafts 18, 20 under predetermined conditions to couple the shafts 18, 20 together to form the combined shaft 24.

The CCPP 10 also includes first and second sensors 31, 32 for measuring operating parameters. For example, the first and second sensors 31, 32 may be positioned to monitor operating parameters associated with the respective output and input shafts 18, 20. In accordance with exemplary embodiments, the first and second sensors 31, 32 may comprise conventional vibration sensors configured to measure vibrational response of the input shaft 20 and output shaft 18, respectively. The first and second sensors 31, 32 may be communicatively connected to a controller 33, and the measurements collected by the first and second sensors 31, 32 may be sent to the controller 33 for use thereby.

Figure 2:
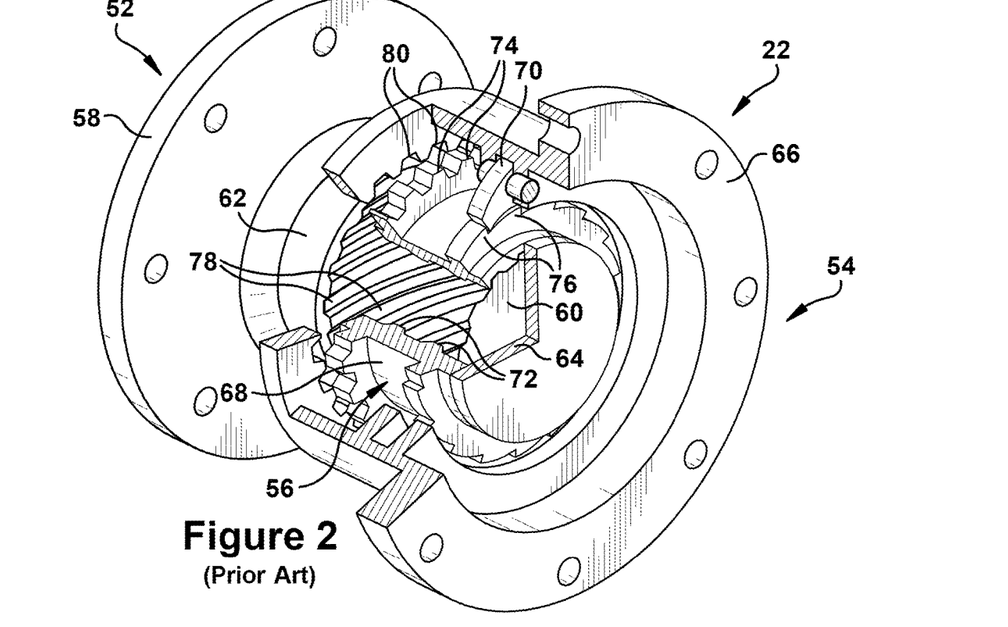
FIG. 2 is a partially cut-away isometric view of a synchro-self-shifting (SSS) clutch that can be employed in the system illustrated in FIG. 1.
Figure 3A:
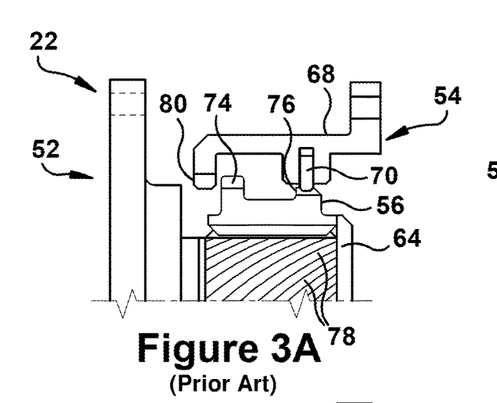
FIG. 3a is a partial sectional side view illustrating the SSS clutch of FIG. 2 in a disengaged configuration.
Figure 3B:
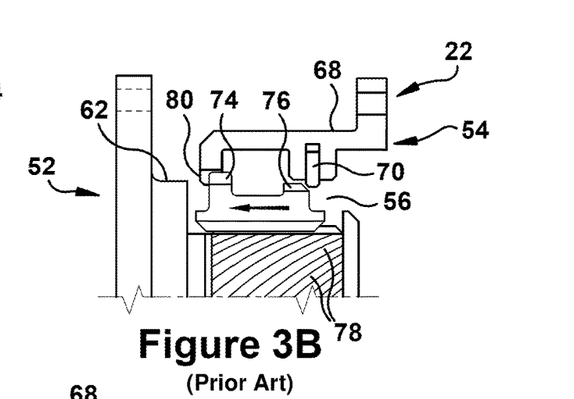
FIG. 3b is a partial sectional side view illustrating the SSS clutch of FIG. 2 in a transition configuration.
Figure 3C:
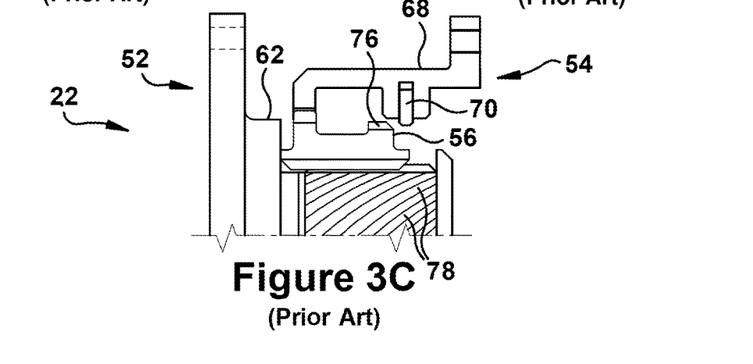
FIG. 3c is a partial sectional side view illustrating the SSS clutch of FIG. 2 in an engaged configuration.

For purposes of background and exemplary operation, an example SSS clutch 22 is illustrated in FIGS. 2 and 3. With specific reference to FIG. 2, the SSS clutch 22 generally includes an input portion 52 (which is positioned at one end of the input shaft 20 of FIG. 1), an output portion 54 (which is positioned at one end of the output shaft 18 of FIG. 1), and a sliding component 56. The input portion 52 includes an input coupling ring 58, an input extension 60, a proximal stop 62, and a distal stop 64. The output portion 54 includes an output coupling ring 66, an output clutch ring 68, and a pawl 70. The sliding component 56 includes internal helical splines 72, external clutch teeth 74, and external ratchet teeth 76. The input extension 60 is configured with external helical splines 78 extending between proximal and distal stops 62 and 64. The sliding component 56 is mounted on the input extension 60 between proximal and distal stops 62 and 64, so that the internal and external splines 72 and 78 matingly engage one another.

With reference to FIG. 3*a*, the SSS clutch 22 is shown in a disengaged configuration where the input extension 60 and the sliding component 56 rotate freely within the output clutch ring 68, and no torque is transmitted from the input portion 52 to the output portion 54. When the rotational speeds of the input extension 60 and the sliding component 56 reach the same speed as the output clutch ring 68, the ratchet teeth 76 of sliding component 56 contact the tip of the pawl 70 to prevent further rotation of the sliding component 56 relative to output clutch ring 68.

FIG. 3*b* shows the SSS clutch 22 in a transition configuration where the pawl 70 prevents rotation of the sliding component 56 relative to the output clutch ring 68, and the difference between the rotational speed of the output portion 54 and the input portion 52 causes the sliding component 56 to move axially along the external helical splines 78 of the input extension 60 toward the proximal stop 62. When one of the ratchet teeth 76 is in contact with the pawl 70, the external clutch teeth 74 of sliding component 56 are perfectly aligned for engagement with the internal clutch teeth 80 of the output clutch ring 68. As the sliding component 56 moves along the input extension 60, the pawl 70 passes out of contact with the ratchet teeth 76, allowing external and internal clutch teeth to come into flank contact and continue the engaging travel. Note that the only load on pawl 70 is that required to shift sliding component 56 along external helical splines 78.

FIG. 3*c* shows the SSS clutch 22 in an engaged configuration where the input portion 52 and output portion 54 are mechanically coupled to one another. Driving torque from the input portion 52 is only transmitted when the sliding component 56 completes its travel by contacting the proximal stop 62, with the internal and external clutch teeth 80, 74 completely engaged and the pawl 70 unloaded. Similar to when a nut is screwed against the head of a bolt, no external thrust is produced when the sliding component 56 reaches the proximal stop 62. If the rotational speed of the input portion 52 is reduced relative to the output portion 54, the torque on the helical splines 78 will reverse. This causes the sliding component 56 to automatically return to the disengaged configuration shown in FIG. 3*a*.

Turning now to the present invention, systems and methods are disclosed for controllably varying the supply and drainage of lubricant in a clutch system during operation. For example, the lubrication supply system of the present invention may regulate lubricant levels within a clutch cavity so that established thresholds are not exceeded that could trigger operation that is harmful to the clutch system. As will be seen, this type of functionality may be used to minimize entrapped volumes of lubricant, which may result in detrimental vibration, while still maintaining lubricant levels necessary for proper operation. More specifically, the present lubrication supply system includes a combination of drain features, supply valves, piping, and/or controls that function to minimize entrapped volumes of lubricant during clutch operation. For example, in accordance with certain embodiments, lubricant supply is regulated based on measured operating parameters. These, for example, may include the vibration characteristics of the shaft system. Additionally, drain features may be strategically located within the clutch to drain areas where oil is expected to accumulate, while the minimum level of oil required for lubrication of key components (e.g., splines, gear teeth, and/or pawls) is maintained.

As will be appreciated, entrapped oil or lubricant can lead to operational issues, including harmful vibration and other potentially detrimental effects. Pursuant to the disclosed methods and systems that follow, these operational issues may be effectively overcome by variably controlling the lubricant supply and/or the use of strategically placed lubricant drains. Further, this is achieved in a cost-effective manner, as the disclosed methods and systems efficiently enable clutch operation that enhances certain aspects of performance, while also ensuring that necessary lubrication levels are maintained.

Figure 4:
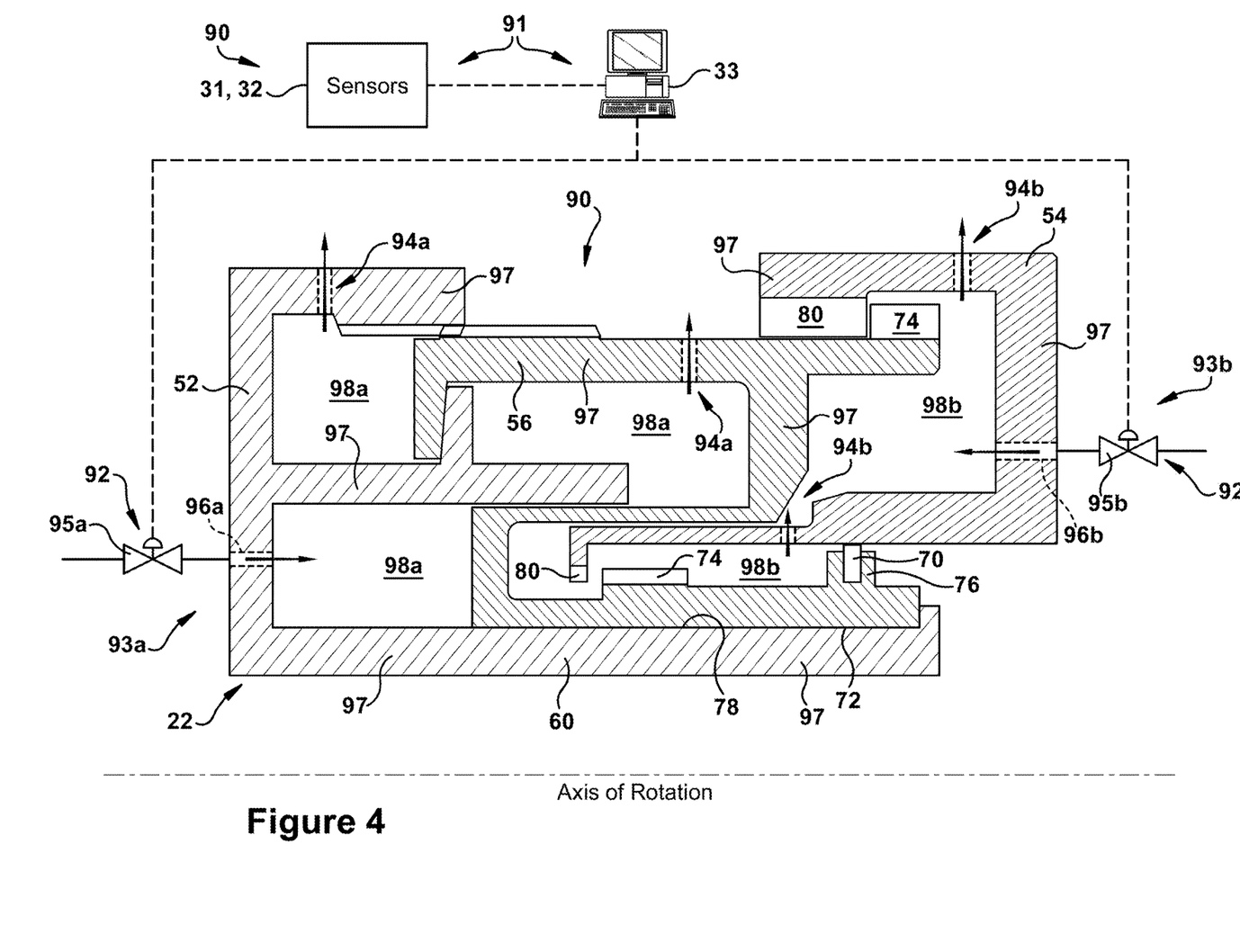
FIG. 4 is a simplified sectional view of a SSS clutch with lubrication supply system in accordance with embodiments of the present application.

With reference now to FIG. 4, a sectional view of a clutch system 90 is provided in accordance with embodiments of the present application. As will be appreciated, the clutch system 90 includes a clutch configured to transmit torque between an input shaft and an output shaft, e.g., the input and output shafts 20, 18 of FIG. 1. As shown, the clutch is a SSS clutch and, thus, generally includes the same or analogous components as the example SSS clutch discussed above in relation to FIGS. 2 and 3. It should be understood that the like components have been labeled using the same reference numerals. Thus, the SSS clutch 22 of FIG. 4 generally includes an input portion 52 disposed at an end of an input shaft (e.g., the input shaft 20 of FIG. 1), an output portion 54 disposed at an end of the output shaft (e.g., the output shaft 18 of FIG. 1), and a sliding component 56. The sliding component 56 slides axially between the input and output portions 52, 54 to engage the SSS clutch 22.

Along with the mechanical components, the clutch system 90 also may include a control system 91 and a lubrication supply system 92. As will be discussed in more detail with reference also to FIG. 5, the control system 91 may include one or more sensors, e.g., sensors 31, 32 of FIG. 1, for measuring an operating parameter related to the operation of the clutch system 90 and/or the CCPP 10. The control system 91 further may include a controller 33 operably linked to the sensors and one or more valves. As explained more below with reference to FIG. 6, the controller 33 may be computer-implemented and, thus, include a hardware processor and a machine-readable storage medium. In accordance with exemplary embodiments, the machine-readable instructions may include instructions that cause the hardware processor to execute a process related to the control of the clutch system 90.

In accordance with exemplary embodiments, the lubrication supply system 92 is configured to allow the supply and/or drainage of lubricant to the clutch to be controllably varied, for example, in response to commands received from the control system 91. In general, the lubrication supply system 92 includes one or more lubricant feeds 93 for delivering a lubricant to the SSS clutch 22. Further, as described more below, the lubrication supply system 92 includes one or more strategically located lubricant drains 94 for draining lubricant from predetermined locations within the interior of the SSS clutch 22.

In regard to the lubricant feeds 93 of the lubrication supply system 92, each of these may include a valve 95. Such valves 95 may comprise a conventional valve chosen for its suitable for controlling the flow of lubricant in the manner described herein. In general, the valve 95 has a plurality of settings by which the amount of the lubricant delivered to the SSS clutch 22 can be varied. The valves 95 may be operable or communicatively linked to the controller 33, which, as described more below, may issue commands to manipulate or change the setting of each of the valves 95. As illustrated, a plurality of the lubricant feeds 93 may be provided in the lubrication supply system 92. For example, a first lubricant feed 93a and second lubricant feed 93b may be included. The first lubricant feed 93a and second lubricant feed 93b may correspond to a first valve 95a and second valve 95b, respectively, with each of the valves 95 providing the means for controlling the amount of lubricant delivered to the clutch via each feed.

For access to the interior of the SSS clutch 22, each of the lubricant feeds 93 includes a feed orifice 96. As used herein, the feed orifice 96 refers to the passageway formed through the exterior of the SSS clutch 22 that allows the delivery of lubricant to a desirable location within the clutch. For example, the first lubricant feed 93a and second lubricant feed 93b of FIG. 4 may correspond to a first feed orifice 96a and second feed orifice 96b, respectively. Though other configurations are also possible, in accordance with preferred embodiments, such feed orifices 96 may be axially oriented (i.e., relative to the axis of rotation of the SSS clutch 22). For example, in accordance with the illustrated embodiment, the first feed orifice 96a is axially oriented and formed through the input portion 52 of the SSS clutch 22, while the second feed orifice 96b is axially oriented and formed through the output portion 54 of the SSS clutch 22. With this configuration, the feed orifices 96 operate on opposing axial sides of the SSS clutch 22 so that lubricant can be efficiently delivered throughout the interior of the SSS clutch 22.

In regard to the lubricant drains 94 of the lubrication supply system 92, it may be helpful to first describe and define certain interior chambers within the SSS clutch 22 that, as will be seen, the lubricant drains 94 are designed to drain. With this in mind, it will be appreciated that the SSS clutch 22 is formed via an assembly of several interconnecting structural walls, which will be generally referenced herein as "walls" 97. As the sectional view of FIG. 4 illustrates, such walls 97 are what form the basic structure of each the three major clutch components—i.e., the input portion 52, the output portion 54, and that sliding component 56. Additionally, each of these major components generally includes several walls 97, which, all together, form the overall structure of the SSS clutch 22. Now, given the configuration and manner in which a SSS clutch operates, the walls 97 necessarily form several internal cavities or, as referred to herein, "chambers" 98. Thus, it should be appreciated that—at least for descriptive purposes—each of the several indicated chambers 98 with SSS clutch 22 is formed by or enclosed within a plurality of the walls 97, and that each of these walls 97 is a part of either the input portion 52, output portion 54, or sliding component 56 of the SSS clutch 22. As further indicated in FIG. 4, the chambers 98 can be further characterized by the particular walls 97 that define them. Thus, a first type of chamber—referenced in FIG. 4 as "98a"—includes the chambers enclosed by walls 97 belonging to the input portion 52 and sliding component 56. And, a second type of chamber—referenced in FIG. 4 as "98b"—includes the chambers enclosed by the walls 97 belonging to the output portion 54 and sliding component 56.

In accordance with exemplary embodiments, each of the lubricant drains 94 of the lubrication supply system 92 are configured to connect to and drain a particular chambers 98 formed within the SSS clutch 22. During operation, the chambers 98 become filled or partially filled with lubricant delivered by the lubricant feeds 93. Because of the high-speed rotation of the SSS clutch 22, that lubricant is forced away from the axis of rotation due to centrifugal force. In this way, lubricant can become entrapped within the chambers 98. This can create forces and/or imbalances within the clutch that causes vibration, which can increase wear to the clutch and other system components and/or limit or prohibit operation of the CCPP. Pursuant to exemplary embodiments, this condition is ameliorated via well-placed lubricant drains 94. Such lubricant drains 94, as illustrated, may include radially oriented orifices (relative to the axis of rotation) so that the centrifugal force drives the drainage of the lubricant through it. Further, the lubricant drains 94 are formed through certain walls 97, for example, most preferably, the walls 97 that form the outer radial boundary of the chamber 98. Finally, the chamber 98 to which the lubricant drains 94 connect are selected according to the propensity of the chamber 98 to entrap lubricant during clutch operation.

For example, in accordance with exemplary embodiments, the chambers 98 of the SSS clutch 22 may include one or more first chambers 98a, which are each enclosed by walls 97 belonging to the input portion 52 and the sliding component 56. In such cases, one or more first lubricant drains 94a may be provided that connect to and drain a respective one of the one or more first chambers 98a. As indicated in the embodiment of FIG. 4, each of the first lubricant drains 94a may be formed through walls 97 that are either part of the input portion 52 or the sliding component 56. As an alternative (or in addition to), the chambers 98 of the SSS clutch 222 may include one or more second chambers 98b, which are each enclosed by walls 97 belonging to the output portion 54 and the sliding component 56. In such cases, one or more second lubricant drains 94b may be provided that connect to and drain a respective one of the one or more second chambers 98b. As indicated in the embodiment of FIG. 4, each of the second lubricant drain 94b may be formed through walls 97 that are part of the output portion 52.

As should be appreciated—as also exhibited in FIG. 4—the lubricant supply system 92 may include several of the lubricant drains 94. In the illustrated example, one of the lubricant drains 94 may be formed through at least one wall 97 that belongs to each of the input portion 52, the output portion 53, and the sliding component 56.

Figure 5:
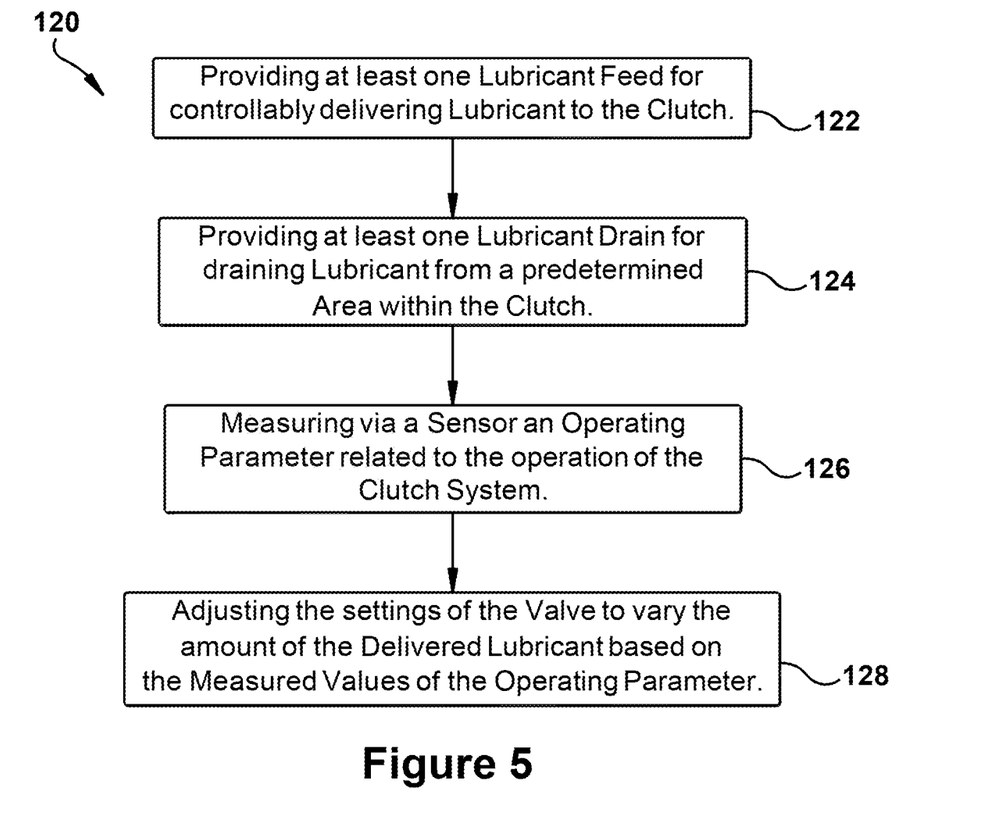
FIG. 5 is a flow diagram illustrating a method for controlling the lubrication supply system in accordance with embodiments of the present application.

With reference now to FIG. 5, a flow diagram 120 is provided that shows a process for controlling the clutch system 90 and/or the lubrication supply system 92 in accordance with embodiments of the present application. As will be appreciated, one or more of the steps in the flow diagram 120 is completed via a computer-implemented controller 33. To do this, the controller 33 operably and communicatively linked to one or more sensors, which measure operating parameters related to the operation of the clutch system 90, and one or more valves, which, as described, control the supply of lubricant being delivered to the SSS clutch 22.

For example, with reference to the flow diagram 120, an initial block 122 includes the step of providing at least one lubricant feed 93 for controllably delivering a lubricant to the clutch. As described above, this may include providing the lubricant feed 93 with the valve 95 that is configurable between a plurality of different settings. The setting of the valve 95 is adjustable during operation of the clutch system 90 so to allow the variation of the amount of lubricant being delivered to the clutch via the lubricant feed 93.

At a next block 124, the process of block diagram 120 includes the step of providing at least one lubricant drain 94 for draining lubricant from a predetermined area within the clutch. As described above, the predetermined area may include a particular chamber 98 that is selected according to the propensity of the chamber 98 to detrimentally entrap lubricant during clutch operation.

At a next block 126, the process of block diagram 120 includes the step of measuring via a sensor an operating parameter related to the operation of the clutch system 90. For example, as described, the sensors may include vibration sensors that measure the vibration of the input shaft, the output shaft, and/or other components within the clutch system 90. Pursuant to conventional systems and apparatus, the sensors may be configured to take vibration measurements at a predefined interval. The sensors may be further configured to communicate this data to the controller 33 for use thereby.

At a final step 128, the process of block diagram 120 includes the step of adjusting the settings of the valve to vary the amount of the lubricant delivered to the clutch based on the measured values of the operating parameter. As explained more with reference to FIG. 6, the controller 33 may include a hardware processor and a machine-readable storage medium on which is stored instructions and/or logic for executing this step. For example, the instructions may include rules for how the current setting of the valve should be changed when particular values for the measured vibration are received. This may include the defining of thresholds and other criteria.

Figure 6:
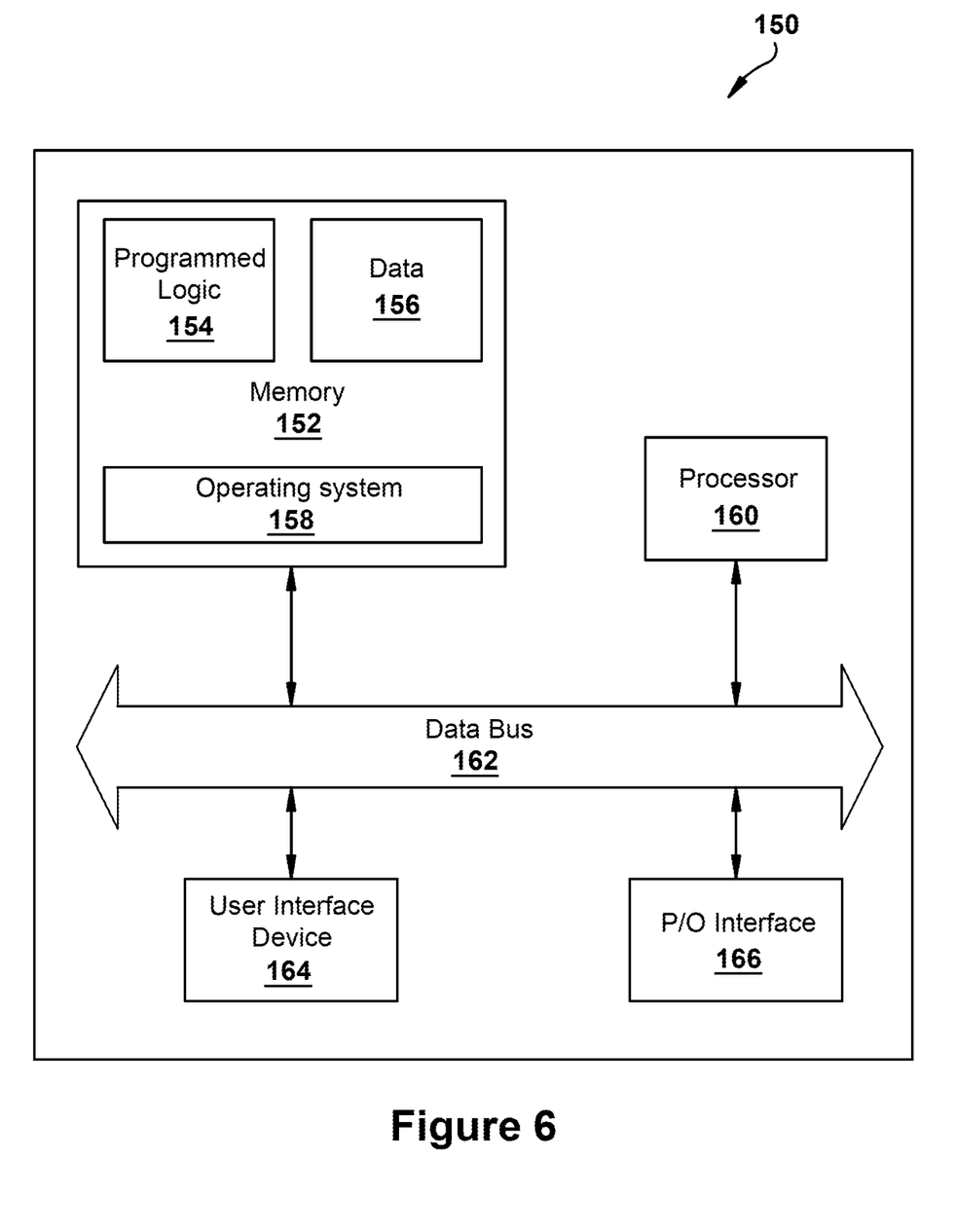
FIG. 6 is an exemplary controller as may be use to implement methods of the present application.

With reference now to FIG. 6, a schematic diagram is shown that depicts an example computer system 150 that may be used to implement the controller 33 (and/or any necessary computer resources suggested herein) in order to perform any of the methods or implement any of the systems discussed herein. Computer system 150 may include a memory 152 that stores programmed logic 154 (e.g., software) and data 156. Memory 152 also may include an operating system 158. A processor 160 may utilize operating system 158 to execute programmed logic 154, and in doing so, may also utilize data 156. A data bus 162 may provide communication between memory 152 and processor 160. Users may interface with computer system 150 via at least one user interface device 164, such as a keyboard, mouse, touchscreen, gesture control device, wearable computer, control panel, or any other device capable of communicating data to and from computer system 150. Computer system 150 may be in communication with devices, including sensors or data recorded from such sensors, while operating via an input/output (I/O) interface 166. Computer system 150 and programmed logic 154 implemented thereby may include software, hardware, firmware, or any combination thereof. It should also be appreciated that multiple controllers or processors may be used in computer system 150, whereby different features described herein may be executed on one or more different controllers or processors.

Accordingly, computer system 150 may be used to implement embodiments of the present disclosure or components or aspects of those embodiments. According to example embodiments, the included figures may reference block diagrams of systems, methods, apparatuses, and computer program products. It should be understood that at least some of the blocks of such block diagrams, and combinations of blocks in the block diagrams may be implemented, at least partially, by computer program instructions, which may be loaded onto a general purpose computer, such as computer system 150, special purpose computer, special purpose hardware-based computer, or other programmable data processing apparatus to produce a machine, such that the instructions, which execute on the computer or other programmable data processing apparatus, create means for implementing the functionality of at least some of the blocks of the block diagrams, or combinations of blocks in the block diagrams discussed. The computer program instructions mentioned herein may also be stored in a computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer-implemented process, such that the instructions that execute on the computer or other programmable apparatus provide steps for implementing the functions specified in the block or blocks. One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and so forth.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, each of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

That which is claimed:

1. A clutch system configured to transmit torque between an input shaft and an output shaft, the clutch system comprising:
a synchronizing self-shifting ("SSS") clutch comprising:
an input portion disposed at an end of the input shaft;
an output portion disposed at an end of the output shaft; and
a sliding component that slides axially between the input and output portions to engage the clutch, wherein the input portion, the output portion, and the sliding component each comprises walls, and wherein the clutch comprises one or more chambers, each of the one or more chambers being enclosed by the walls of at least two of the input portion, the output portion, and the sliding component, wherein the one or more chambers include a second chamber enclosed by the walls of the output portion and the walls of the sliding component;
a lubrication supply system comprising:
one or more lubricant feeds for delivering a lubricant to the clutch;
one or more lubricant drains for draining the lubricant from the clutch, and wherein the one or more lubricant drains includes a second lubricant drain that connects to the second chamber;
wherein the one or more lubricant feeds comprises one or more respective valves, the one or more valves each being configurable between settings that vary an amount of the lubricant delivered to the clutch via the respective one of the one or more lubricant feeds.

2. The clutch system according to claim 1, further comprising a control system that includes:
a sensor for measuring an operating parameter related to an operation of the clutch system; and
a controller operably linked to the sensor and the one or more valves;
wherein the controller comprises:
a hardware processor;
a machine-readable storage medium on which is stored instructions that cause the hardware processor to execute a process related to controlling one or more aspects of the clutch system; wherein the process includes the steps of:
receiving data of the measured operating parameter from the sensor;
based on the received data from the sensor, adjusting the settings of the one or more valves in order to vary the amount of the lubricant delivered to the clutch.

3. The clutch system according to claim 2, wherein the sensor comprises a vibration sensor and the operating parameter comprises a vibration of one of the input shaft and the output shaft.

4. The clutch system according to claim 1, wherein the one or more chambers of the clutch include a first chamber enclosed by the walls of the input portion and the walls of the sliding component; and
wherein the one or more lubricant drains includes a first lubricant drain that connects to the first chamber.

5. The clutch system according to claim 4, wherein the first lubricant drain comprises a radial orientation and is formed through a one of the walls that defines an outer radial boundary of the first chamber.

6. The clutch system according to claim 4, wherein the first lubricant drain is formed through one of the walls of the input portion.

7. The clutch system according to claim 4, wherein the first lubricant drain is formed through one of the walls of the sliding component.

8. The clutch system according to claim 1, wherein the second lubricant drain comprises a radial orientation and is formed through a one of the walls that defines an outer radial boundary of the second chamber.

9. The clutch system according to claim 1, wherein the second lubricant drain is formed through one of the walls of the output portion.

10. The clutch system according to claim 1, wherein the one or more chambers of the clutch include:
a first chamber enclosed between the walls of the input portion and the walls of the sliding component; and
wherein the one or more lubricant drains includes a first lubricant drain that
connects to the first chamber, and is formed through one of the walls of one of the input portion and the sliding component; and
wherein the second lubricant drain
is formed through one of the walls of the output portion.

11. The clutch system according to claim 1, wherein the one or more lubricant drains includes a first lubricant drain, and a third lubricant drain; wherein:
the first lubricant drain comprises a radially oriented drain formed through one of the walls of the input portion;
the second lubricant drain comprises a radially oriented drain formed through one of the walls of the sliding component; and
the third lubricant drain comprises a radially oriented drain formed through one of the walls of the output portion.

12. The clutch system according to claim 1, wherein the one or more lubricant feeds comprise one or more respective feed orifices, each of the one or more feed orifices comprising an axial orientation passage formed through at least one of the input portion and the output portion.

13. The clutch system according to claim 12, wherein the one or more lubricant feeds comprises a first lubricant feed and a second lubricant feed;
wherein:
the one or more valves comprises a first valve and a second valve that correspond respectively to the first lubricant feed and the second lubricant feed; and
the one or more feed orifices comprises a first feed orifice and a second feed orifice that correspond respectively to the first lubricant feed and the second lubricant feed;
wherein:
the first feed orifice is formed through the input portion; and
the second feed orifice is formed through the output portion.

14. A method for operating a clutch system that is configured to transmit torque between an input shaft and an output shaft, wherein the clutch system comprises a synchronizing self-shifting ("SSS") clutch that includes an input portion disposed at an end of the input shaft, an output portion disposed at an end of the output shaft, and a sliding component that slides axially between the input and output portions to engage the clutch, the method comprising the steps of:
providing one or more lubricant feeds for delivering a lubricant to the clutch, the one or more lubricant feeds comprising one or more respective valves that each are configurable between settings that vary an amount of the lubricant delivered to the clutch via the respective one of the one or more lubricant feeds;

providing one or more lubricant drains for draining the lubricant from the clutch;

measuring via a sensor an operating parameter related to an operation of the clutch system, wherein the sensor comprises a vibration sensor and the operating parameter comprises a vibration of one of the input shaft and the output shaft; and based on a measured value of the operating parameter, adjusting the settings of the one or more valves in order to vary the amount of the lubricant delivered to the clutch.

* * * * *